UNITED STATES PATENT OFFICE.

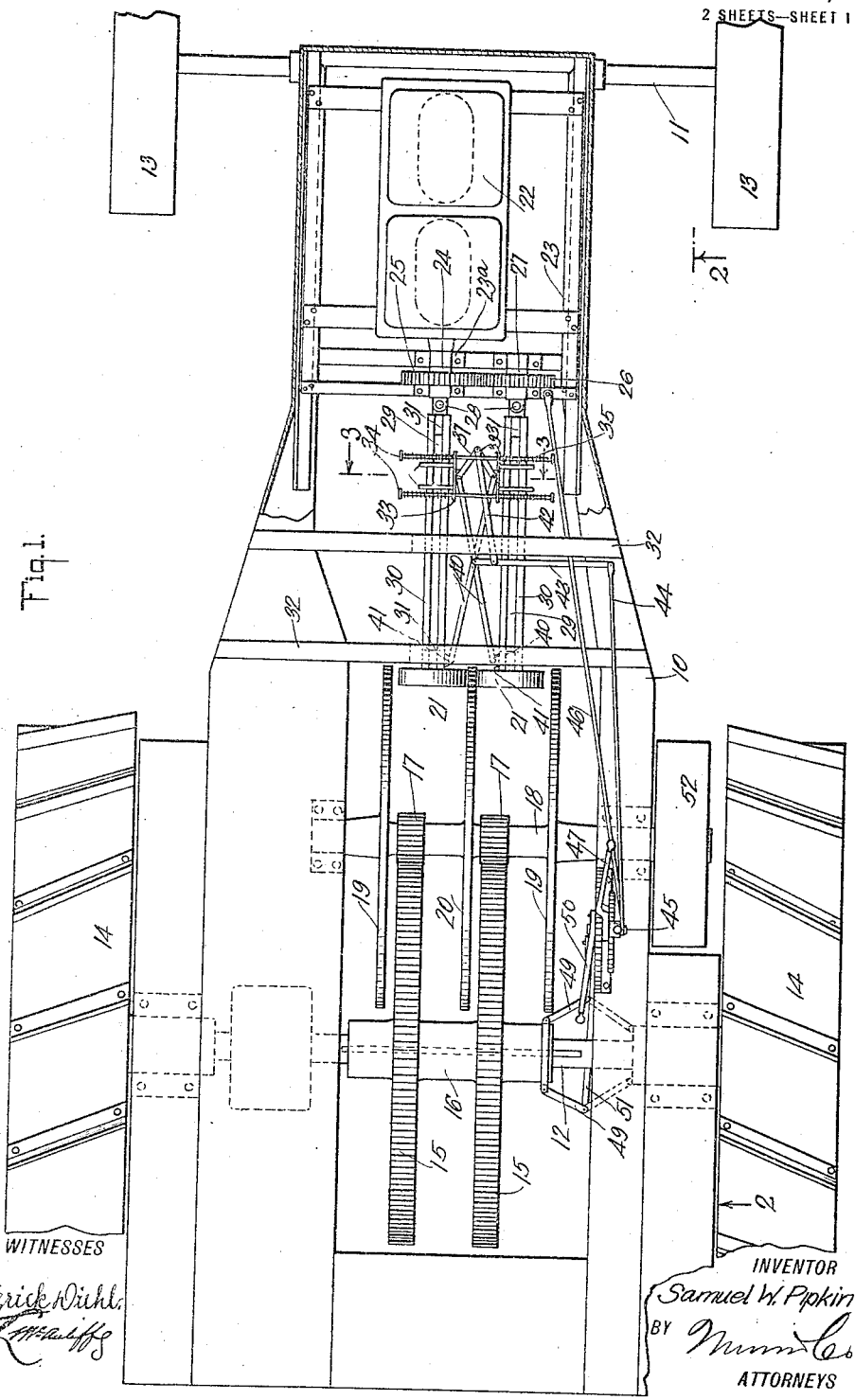

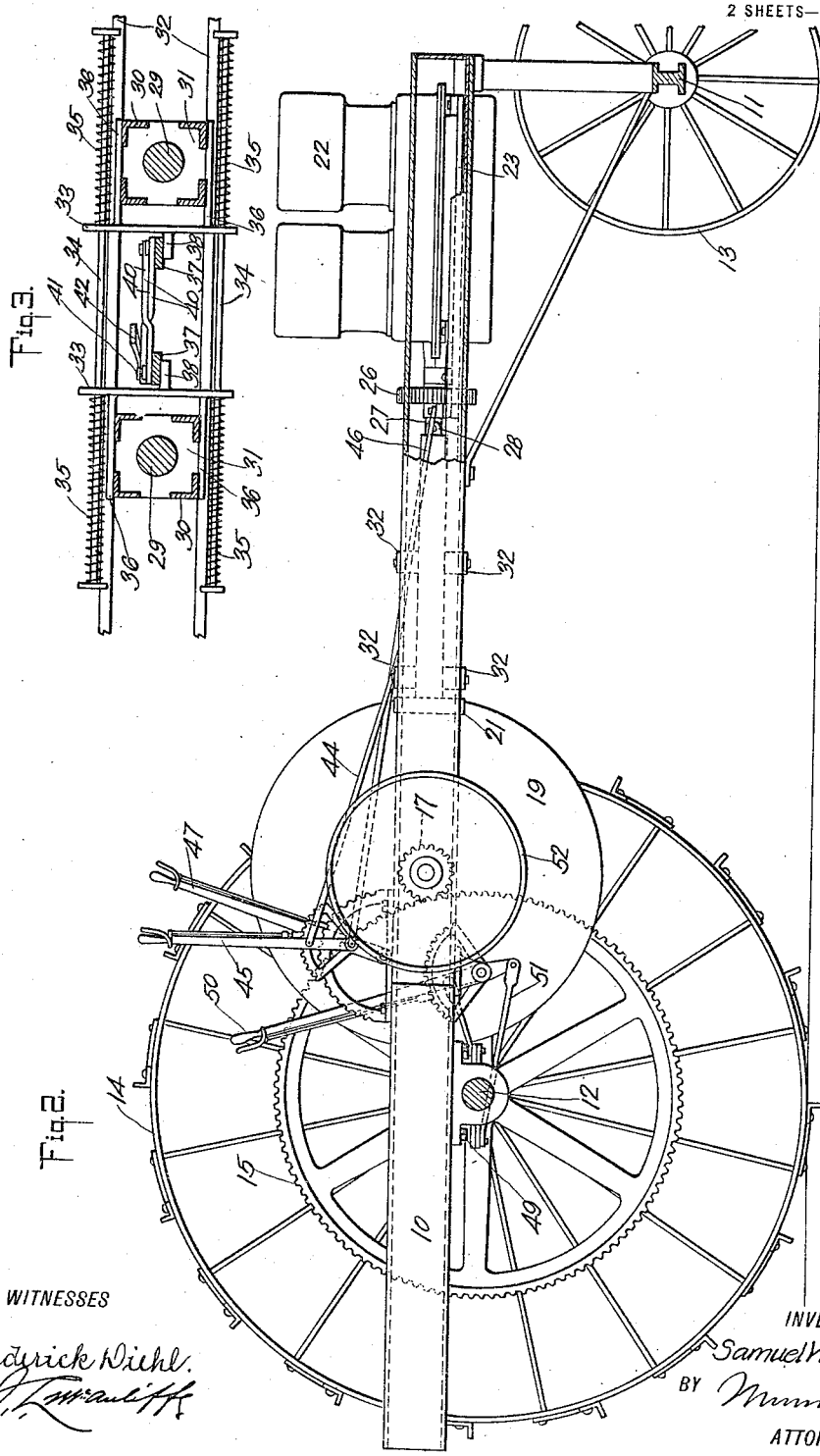

SAMUEL W. PIPKIN, OF CLAUD, NEW MEXICO.

TRACTOR-DRIVE.

1,293,541.  Specification of Letters Patent.  Patented Feb. 4, 1919.

Application filed February 27, 1918. Serial No. 219,485.

*To all whom it may concern:*

Be it known that I, SAMUEL W. PIPKIN, a citizen of the United States, and a resident of Claud, in the county of Curry and State of New Mexico, have invented a new and Improved Tractor-Drive, of which the following is a description.

My invention relates to a friction drive and more particularly is intended for embodiment in a tractor drive.

The prime object of my invention is to provide a drive means involving friction pinions and friction disks to be engaged thereby and in which an effective driving engagement is insured between the pinions and the engaged disks.

A further important object of the invention is to provide novel means controlling the friction pinions and operable to vary the speed or to reverse.

Reference is to be had to the accompanying drawings forming a part of this specification, it being understood that the drawings are merely illustrative of one example of the invention.

Figure 1 is a plan view of a tractor embodying my invention, a portion of the main frame being broken away to better show the slidable engine frame;

Fig. 2 is a sectional side elevation, the view being taken generally as indicated by the line 2—2, Fig. 1, a portion of the main frame at the front being broken away;

Fig. 3 is an enlarged transverse detail section on the line 3—3, Fig. 1.

In carrying out my invention in accordance with the illustrated example, a suitable wheeled main frame 10 is provided, having a front axle 11 and a rear drive axle 12 having respectively, wheels 13 and 14, the latter being the traction wheels.

The drive axle 12 is provided with a pair of gear wheels 15 rigid with each other, being formed on a hub 16 which is keyed to the axle 12 to slide thereon in the manner hereinafter described, whereby to engage or disengage said driven gear wheels with gear pinions 17 on a transverse jack shaft 18. The shaft 18 is driven by my improved friction drive means which includes three friction disks, there being outer friction disks 19 and an intermediate friction disk 20. Said disks are adapted to be driven by friction pinions 21 driven by any suitable engine indicated conventionally at 22, said engine being mounted on a frame 23 which is slidable longitudinally of the main frame 10.

The engine shaft 24 turns in suitable bearings 23ª in the sliding frame 23 and has fixed thereon a toothed pinion 25 which meshes with a similar pinion 26 on a short countershaft 27 parallel with the engine shaft 24 and turning in suitable bearings, in the engine frame 23. A suitable universal joint 28 connects each of the shafts 24, 27 with the shafts 29 carrying the friction pinions 21, so that the sliding of the engine frame 23 will serve to shift the positions of said friction pinions to or from the axis of rotation of the disks 19, 20. The shafts 30 have suitable bearings 31 in the ends of elongated boxes or frames 30 which have guided sliding movement between top and bottom cross bars 32 on the main frame 10 as the engine frame is shifted back and forth. At the same time the shafts 29 and their frames 30 may swing laterally relatively to each other by reason of the universal joints 28, and it will be clear from the inspection of Fig. 1 that the pinions 21 may be brought against opposite sides of the intermediate disk 20 for turning the shaft 18 in one direction or swung outwardly against the respective outer disks 19 for frictional engagement with the latter to thereby reverse the direction of movement of the shaft 18. Thus, the swinging of the shafts 29 and the friction pinions 21 laterally will serve to effect a forward or reverse drive while the movement of the pinions to or from the shaft 18 with the sliding of the engine frame varies the speed regardless of the direction of movement. It will be understood that the faces of the friction pinions 21 may be formed of any suitable material to insure a frictional driving contact even though the faces of said pinions have a slight angle to the outer disks.

Any suitable means may be provided to throw the shafts 29 outward for driving the disks 19 and to return the shafts for engaging the pinions 21 with the intermediate disk 20. In the illustrated example plates or frames 33 are disposed at the inner sides of the frames 30 and suitably secured to said frames 30 as by arms 36. Also, upper and lower transverse rods 34 extend through said plates 33 and have springs 35 coiled on the rods to normally tend to maintain the frames 30 in positions for the pinions 31 to have driving engagement with the disk 20. The plates 33 are connected by toggle links 37 one end of each link being connected to lugs 38 or on the plates 33 and the links being united at their opposite ends by a pivot as at 39. Cross links 40 are also provided between the frames 30, said cross links being connected at one end to the lugs 38 and at their opposite ends connected to the shafts 29 adjacent to the pinions 21 as indicated at 41. A lever 43 is secured at one end to the links 40 at their point of crossing and a link 42 connects said lever 43 between its ends with the pivot 39 of the toggle links 37 and the free end of said lever 43 is connected by a connecting rod 44 with a hand lever 45, whereby the throwing of the lever 45 will act through the connections 42, 43 and 44, the toggle links and cross links 40 to swing the shafts 29 and their frames 30 outwardly with their universal joints 28 as centers, whereby to throw the friction pinions 21 into engagement with the outer disks 19. On the other hand the springs 35 will restore the shafts 29 to positions for the friction pinions 21 to engage the intermediate disk 20. To slide the engine frame 23 any suitable means may be provided, there being shown for the purpose a connecting rod 46 secured at its forward end to said frame 23 and connected at its rear end with a hand lever 47. In order to shift the hub 16 of the drive gears 15 on the axle 12, I provide toggle links 49 connected with said hub, and a hand lever 50 connects by a link or connecting rod 51 with one pair of said toggle links 49 at the point of connection at one pair of said links.

The numeral 52 indicates a belt pulley by which power for miscellaneous purposes may be taken from shaft 18. At 53 I have conventionally indicated in dotted lines the casing of a differential gear for the left end of the drive axle, it being understood that the differential may be variously arranged and forms no part of my invention.

I would state in conclusion that although the illustrated example constitutes a practical embodiment of my invention, I do not limit myself strictly to the mechanical details herein illustrated, since manifestly the same can be considerably varied without departure from the spirit of the invention as defined in the appended claims.

Having thus described my invention, I claim as new, and desire to secure by Letters Patent:

1. In a drive means of the class described, a main frame, an engine frame slidable on the main frame, an engine on the engine frame, drive shafts actuated by the engine and slidable with the engine and engine frame, universal joints in said shafts, means to slide the engine frame, means to swing the drive shafts on their universal joints to and from each other, a jack shaft on the main frame transverse to the drive shafts, three spaced friction disks on the jack shaft, and friction pinions on the drive shafts, the pinions being movable laterally with the drive shafts into or out of driving engagement with the central disk of the three or with the outer disks and slidable with the shafts and engine frame to vary their position relatively to the axis of rotation of the jack shaft.

2. In a drive means of the class described, a pair of driven shafts slidable longitudinally and mounted to turn, said shafts each having a universal joint whereby to swing relatively to each other, drive pinions fixed on said shafts to turn and slide therewith and to move laterally relative to each other with the lateral movements of the shaft, friction disks turning about an axis transverse to said shafts and including a central disk extending between the friction pinions and the disks outside of the pinions whereby the pinions may frictionally engage either the outer disks or the intermediate disk, means forming bearings for said shaft and shiftable laterally for the shifting of the shafts, toggle links between said bearings, a lever having connections with said links to cause the same to shift the bearings for swinging the shafts outwardly, and spring means tending to return the shafts after an outward movement thereof.

3. In a drive means of the class described, a main frame, an engine frame slidable on the main frame, an engine shaft having bearings in the engine frame, a counter-shaft on the engine frame, toothed pinions on the engine shaft and counter-shaft and meshing with each other, drive shafts connected by a universal joint with the said engine shaft and counter-shaft to slide with the sliding of the engine frame, friction pinions on said drive shafts to turn and slide therewith and movable with the shafts when the latter are moved on their universal joints, and friction disks mounted to turn about an axis transverse to the drive shafts, said disks including an intermediate disk extending between the friction pinions and outer disks outside of the pinions, the pinions being laterally shiftable relatively to each other with the shifting of the shafts on their universal joints so that the pinions may engage the intermediate friction disk at opposite sides or be moved into driving engagement with the outer disks.

SAMUEL W. PIPKIN.